US012308564B2

(12) United States Patent
Seon

(10) Patent No.: US 12,308,564 B2
(45) Date of Patent: May 20, 2025

(54) CONNECTOR STRUCTURE INCLUDING MAGNET

(71) Applicant: LG Energy Solution, Ltd., Seoul (KR)

(72) Inventor: Sang Ok Seon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 469 days.

(21) Appl. No.: 17/801,072

(22) PCT Filed: Jul. 22, 2021

(86) PCT No.: PCT/KR2021/009476
§ 371 (c)(1),
(2) Date: Aug. 19, 2022

(87) PCT Pub. No.: WO2022/019672
PCT Pub. Date: Jan. 27, 2022

(65) Prior Publication Data

US 2023/0084832 A1 Mar. 16, 2023

(30) Foreign Application Priority Data

Jul. 22, 2020 (KR) ........................ 10-2020-0091281

(51) Int. Cl.
*H01R 13/00* (2006.01)
*H01R 13/62* (2006.01)

(52) U.S. Cl.
CPC ................................ *H01R 13/6205* (2013.01)

(58) Field of Classification Search
CPC ........................... H01R 13/6205; H01R 11/30; H01R 2103/00; H01R 13/22
See application file for complete search history.

(56) References Cited

U.S. PATENT DOCUMENTS 6,030,229 A 2/2000 Tsutsui
7,344,380 B2 * 3/2008 Neidlein ............ H01R 13/6205 439/378
9,147,965 B2 * 9/2015 Lee .................... H01R 13/6205
(Continued)

FOREIGN PATENT DOCUMENTS

CN 112018559 A 12/2020
JP S392140 A 3/1939
(Continued)

OTHER PUBLICATIONS

Extended European Search Report including Written Opinion for Application No. 21846176.2 dated Nov. 9, 2023, pp. 1-9.
(Continued)

*Primary Examiner* — Phuong Chi Thi Nguyen
(74) *Attorney, Agent, or Firm* — Lerner David LLP

(57) ABSTRACT

A connector structure in which a male connector and a female connector are easily coupled to each other. The connector structure includes a coupling part, a housing, and a first removing tool. The coupling part is coupled to the female connector in a coupling mode and separated from the female connector in a separating mode. The housing includes a first magnet on a first surface among surfaces surrounding the coupling part and is configured to attract the female connector by using magnetic force of the first magnet. The first removing tool is configured to rotate a second magnet in the separating mode so as to weaken the magnetic force.

14 Claims, 13 Drawing Sheets

(56) References Cited

U.S. PATENT DOCUMENTS

| | | | | |
|---|---|---|---|---|
| 10,666,309 | B2 * | 5/2020 | Carnevali | G06F 1/1632 |
| 2011/0018484 | A1 * | 1/2011 | Fullerton | H02K 29/00 310/156.43 |
| 2013/0113584 | A1 * | 5/2013 | Hunts | H01F 7/0242 335/285 |
| 2014/0087569 | A1 * | 3/2014 | Lee | H01R 13/6205 439/39 |
| 2016/0111815 | A1 | 4/2016 | Szeto et al. | |
| 2016/0141809 | A1 | 5/2016 | Choi | |
| 2016/0204545 | A1 | 7/2016 | Szeto et al. | |
| 2018/0191097 | A1 | 7/2018 | Yonnet | |
| 2018/0337467 | A1 | 11/2018 | Szeto et al. | |
| 2019/0011950 | A1 | 1/2019 | Shaw et al. | |

FOREIGN PATENT DOCUMENTS

| | | | |
|---|---|---|---|
| JP | H10112354 | A | 4/1998 |
| JP | H10-255894 | A | 9/1998 |
| JP | 3401740 | B2 | 4/2003 |
| JP | 2009205912 | A | 9/2009 |
| JP | 2009259411 | A | 11/2009 |
| JP | 12018055959 | A | 4/2018 |
| JP | 2020024826 | A | 2/2020 |
| KR | 20080092029 | A | 10/2008 |
| KR | 20140013773 | A | 2/2014 |
| KR | 200479419 | Y1 | 1/2016 |
| KR | 20160024299 | A | 3/2016 |
| KR | 20160059270 | A | 5/2016 |
| KR | 101745579 | B1 | 6/2017 |
| KR | 20170069285 | A | 6/2017 |
| KR | 101805446 | B1 | 12/2017 |
| KR | 20180022938 | A | 3/2018 |
| KR | 102063936 | B1 | 1/2020 |
| KR | 20200023738 | A | 3/2020 |

OTHER PUBLICATIONS

International Search Report for Application No. PCT/KR2021/009476 mailed Oct. 28, 2021, pp. 1-3.

* cited by examiner

CONNECTOR STRUCTURE INCLUDING MAGNET

CROSS-REFERENCE TO RELATED APPLICATION

The present application is a national phase entry under 35 U.S.C. § 371 of International Application No. PCT/KR2021/009476 filed Jul. 22, 2021, which claims priority from Korean Patent Application No. 10-2020-0091281, filed on Jul. 22, 2020, all of which are incorporated herein by reference.

TECHNICAL FIELD

Technical Field

The present invention relates to a connector structure, and more particularly, to a connector structure including a magnet.

Background Art

Recently, as demands for portable electronic products such as laptops, video cameras, and mobile phones have rapidly increased, and development of electric vehicles, energy storage batteries, robots, satellites, etc. is regularized, studies on high-performance secondary batteries that are repeatedly chargeable and dischargeable are being actively conducted.

Currently commercialized secondary batteries include nickel cadmium batteries, nickel hydride batteries, nickel zinc batteries, and lithium secondary batteries. Among them, when compared to nickel-based secondary batteries, the lithium secondary batteries are attracting attention because of their advantages such as freedom of charging and discharging, very low self-discharge rate, and high energy density due to almost no memory effect. Since various kinds of combustible materials are embedded in the secondary batteries, there is a risk of heat generation and explosion due to overcharging, overcurrent, and other physical external impacts. Accordingly, the battery pack may use a connector so as to be separated from an external device according to situation. However, there is a problem in that strong force is required to couple or separate the battery pack to/from the external device, and thus, the connector is easily damaged by the strong force.

SUMMARY

Technical Problem

The present invention is invented to solve the above-described technical problems, and an object of the present invention is to provide a connector structure in which a male connector and a female connector are easily coupled to each other by using a magnet.

Technical Solution

The connector structure according to an embodiment of the present invention may include a connector insert removably connectable to a female connector; and a housing comprising a first magnet on a first surface of the connector insert, the housing being configured to attract the female connector by a magnetic force of the first magnet, wherein the first magnet is rotatable between a coupling mode and a separating mode, wherein the magnetic force between the first magnet and the female connector is stronger in the coupling mode than in the separating mode.

In some examples, the connector structure may further include a first tool comprising a second magnet configured to rotate to control a rotation of the first magnet of the housing between the coupling mode and the separating mode.

In some examples, each of the first magnet and the second magnet may be cylindrical.

In some examples, the first surface may face the first tool, and in the coupling mode, first and second poles of the second magnet may align with first and second poles of the first magnet, respectively, and, in the separating mode, the first and second poles of the second magnet may align with the second and first poles of the first magnet, respectively.

In some examples, each of the first magnet and the second magnet may be circular, and each of the first and second poles of the first and second magnets may be semicircular.

In some examples, each of the first and second magnets may be circular and divided into four quadrants that alternate between the first pole and the second pole.

In some examples, the connector structure may be configured to control a distance between the first tool and the housing, and the connector structure may be configured to control the first tool to be closer to the housing in the separating mode and to be farther from the housing in the coupling mode In some examples, the housing may include a third magnet on a second surface opposite the first surface, the housing may be configured to attract the female connector by a magnetic force of the third magnet, the third magnet may be rotatable between the coupling mode and the separating mode, the magnetic force between the third magnet and the female connector may be stronger in the coupling mode than in the separating mode, and the second surface may face the second tool.

In some examples, the connector structure may be configured to control a distance between the second tool and the housing, and the connector structure may be configured to control the second tool to be closer to the housing in the separating mode and to be farther from the housing in the coupling mode.

In some examples, the first magnet may be divided into sections by one or more boundary lines, adjacent sections of the first magnet may have different polarities, and the one or more boundary lines may be antiparallel to a plane on which the connector structure is configured to be mounted.

A connector structure according to another embodiment of the present invention may include a connector insert removably connectable to a female connector; a housing comprising a first magnet on a first surface of the connector insert, the housing being configured to attract the female connector by a magnetic force of the first magnet; and a tool comprising a second magnet configured to move to control a strength of the magnetic force between the first magnet and the female connector between a coupling mode and a separating mode based on a distance of the second magnet from the housing, wherein the second magnet is farther from the housing and the magnetic force is stronger in the coupling mode, and wherein the second magnet is closer to the housing and the magnetic force is weaker in the separating mode.

In some examples, the connector structure may be configured to control a distance between the tool and the housing, the connector structure may be configured to control the tool to be closer to the housing in the separating mode and to be farther from the housing in the coupling mode.

In some examples, at least one of the first magnet or the second magnet may be configured to rotate between a first rotational position and a second rotational position, in the coupling mode, a portion of the first magnet may have a first polarity is rotationally aligned with a portion of the second magnet have the first polarity, and in the separating mode, the portion of the first magnet may be rotationally aligned with a portion of the second magnet having a second polarity different from the first polarity.

In some examples, in the separating mode, a portion of the second magnet may have a first polarity is aligned with a corresponding portion of the first magnet having a second polarity different from the first polarity.

Advantageous Effects

According to the embodiment of the present invention, the connector structure (e.g., the male connector) coupled to the female connector may include the magnet. In the coupling mode, the connector structure may be more easily coupled to the female connector by using the magnetic force of the internal magnet. In the separating mode, the connector structure may use the magnet of the removing tool to offset the magnetic force. Therefore, the female connector may be separated from the connector structure without being affected by the magnetic force acting in the coupling mode.

DETAILED DESCRIPTION

Figure 1:
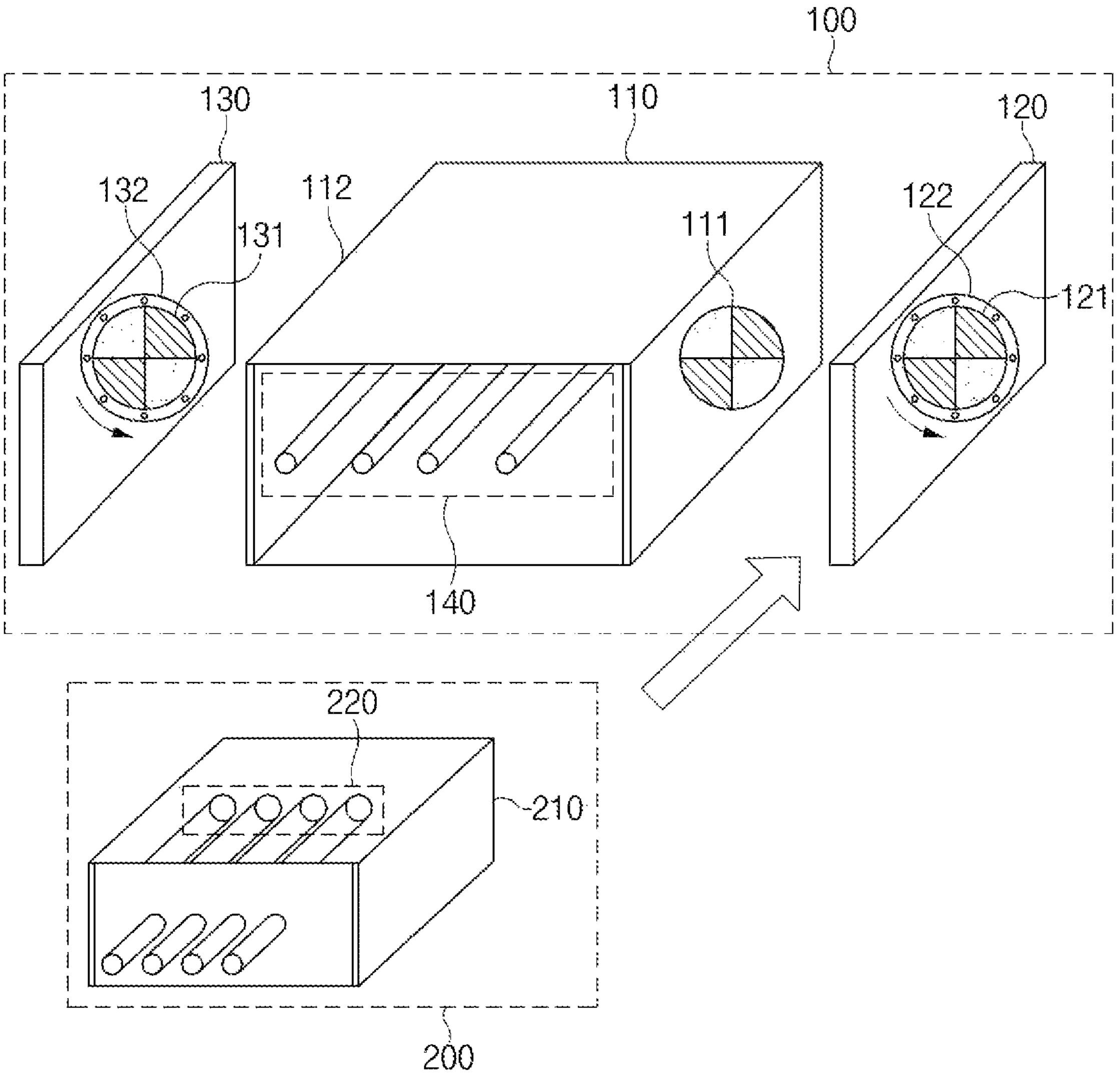
FIG. 1 is a conceptual view for explaining a method for coupling a connector to a connector structure according to an embodiment of the present invention.

Hereinafter, various embodiments will be described in detail with reference to the accompanying drawings. In this document, same reference numerals are used for the same components in the drawings, and duplicated descriptions of the same components will be omitted.

For the various embodiments of the present invention disclosed in this document, specific structural or functional descriptions have been exemplified for the purpose of describing the embodiments of the present invention only, and various embodiments of the present invention may be implemented in various forms and should not be construed as being limited to the embodiments described in this document.

Expressions such as "first", "second", "firstly", or "secondly" used in various embodiments may modify various elements regardless of their order and/or importance and may not limit the corresponding elements. For example, the first component may be referred to as the second element, and similarly, the second component may be referred to as the first component without departing from the scope of the present invention.

Terms used in this document are only used to describe a specific embodiment and may not be intended to limit the scope of other embodiments. The terms of a singular form may include plural forms unless referred to the contrary.

All terms used herein, which include technical or scientific terms, may have the same meaning as commonly understood by one of ordinary skill in the art of the present invention. Terms defined in general used in the dictionary may be interpreted as having the same or similar meaning as the meaning in the context of the related art, and unless explicitly defined in this document, it is not interpreted in an ideal or excessively formal meaning. In some cases, even terms defined in this document may not be construed to exclude embodiments of the present invention.

Figure 2:
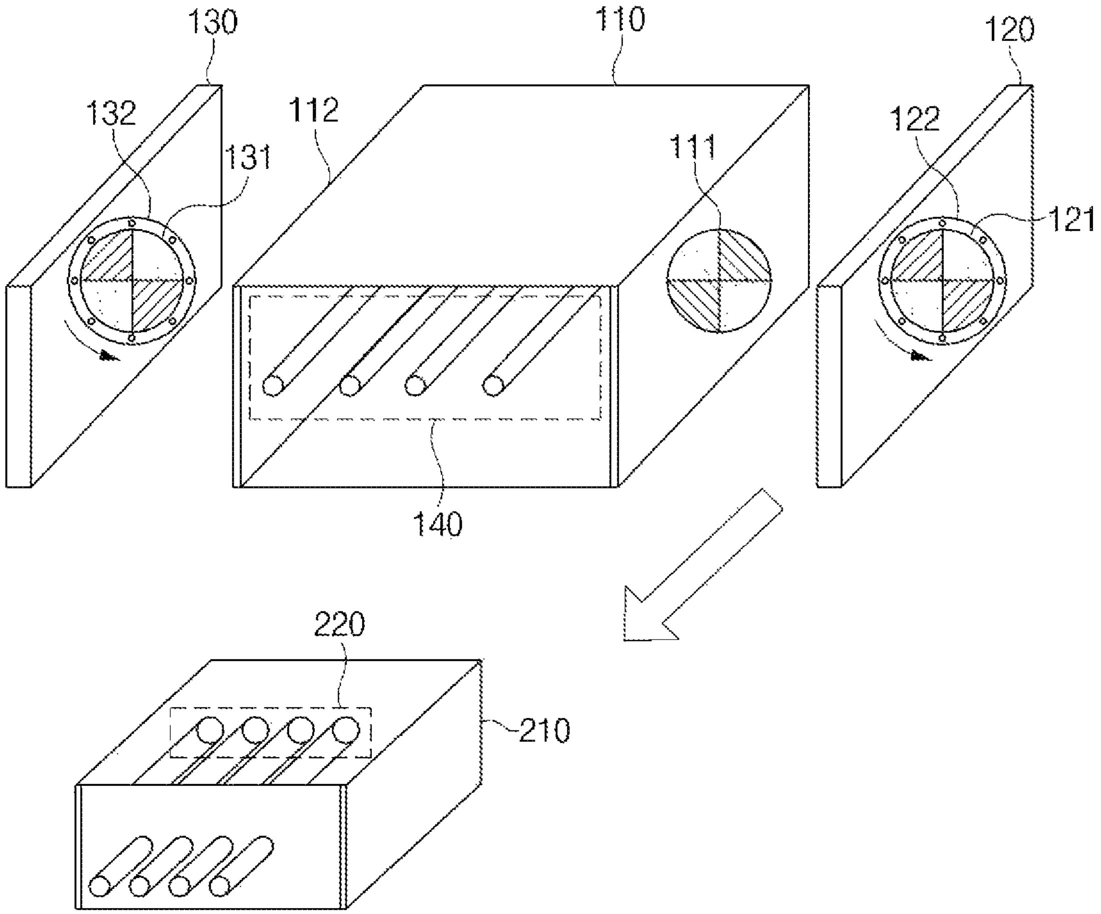
FIG. 2 is a conceptual view for explaining a method for separating the connector from the connector structure according to an embodiment of the present invention.

FIG. 1 is a conceptual view for explaining a method for coupling a connector to a connector structure according to an embodiment of the present invention. FIG. 2 is a conceptual view for explaining a method for separating the connector from the connector structure according to an embodiment of the present invention. In order to facilitate understanding of the present invention, FIGS. 1 and 2 will be described together.

A connector structure 100 may include a housing 110, removing tools 120, 130, and a coupling part 140. A connector 200 may include a housing 210 and a coupling part 220. For example, the connector structure 100 may be a male connector, and the connector 200 may be a female connector. The connector structure 100 may be coupled to or separated from the connector 200 according to an operation mode of the connector structure 100.

The connector structure 100 may be connected to a battery pack. In this case, the connector 200 may be connected to internal circuits of various devices such as a vehicle, a portable camera, and a mobile phone. However, the present invention is not limited thereto, and the connector structure 100 may be connected to the internal circuits of the various devices, and the connector 200 may be connected to the battery pack. When the connector structure 100 and the connector 200 are coupled to each other, the connector structure 100 or devices connected to the connector 200 may receive power from the connector 200 or the battery pack connected to the connector structure 100. In the following descriptions, the "coupling mode" means an operation mode of the connector structure 100 while the connector 200 is coupled to the connector structure 100. The "separating mode" means an operating mode of the connector structure 100 while the connector 200 is separated from the connector structure 100.

The coupling part 140 may include a plurality of terminals. In FIG. 1, a structure in which four terminals are provided in the coupling part 140 is illustrated, but the present invention is not limited thereto.

The coupling part 220 may include a plurality of terminals. The number of terminals included in the coupling part 220 may be the same as the number of terminals included in the coupling part 140. In FIG. 1, a structure in which four terminals are provided in the coupling part 220 is illustrated, but the present invention is not limited thereto.

When the connector structure 100 is coupled to the connector 200, the plurality of terminals of the coupling part 140 may be inserted into the plurality of terminals of the coupling part 220. When the connector structure 100 is coupled to the connector 200, current may flow through the plurality of terminals of the coupling part 140 and the coupling part 220.

The housing 110 may be a structure surrounding the coupling part 140. The housing 110 may include the coupling part 140 therein. The housing 210 may be a structure surrounding the coupling part 220. The housing 210 may include the coupling part 220 therein. When the connector structure 100 is coupled to the connector 200, the housing 210 may be inserted into the housing 110. Each of the housings 110 and 210 may be made of an insulating material.

In this specification, it is assumed that the housing 110 includes four surfaces. Among the four surfaces, a surface facing the removing tool 120 is referred to as a first surface. Among the remaining three surfaces, a surface facing the removing tool 130 is referred to as a second surface. Among the remaining two surfaces, a surface that is in contact with the bottom is referred to as a third surface. The remaining surface is referred to as a fourth side The housing 110 may include circular magnets 111 and 112. In FIG. 1, it is assumed that the housing 110 includes a first circular magnet 111 and a second circular magnet 112 on the first and second surfaces, respectively, but the present invention is not limited thereto. The housing 110 may include only one circular magnet or may include two or more circular magnets. Also, when the housing 110 includes one circular magnet, the circular magnet may be disposed on any surface of the four surfaces of the housing 110.

Since the circular magnet 112 has substantially the same structure as the circular magnet 111, the circular magnet 111 is mainly described in the following descriptions.

The circular magnet 111 may include a first pole and a second pole. When the first pole is an N pole, the second pole is an S pole, and when the first pole is an S pole, the second pole is an N pole.

The circular magnet 111 may have a cylindrical shape. A height of the cylinder may be less than or equal to a thickness of the first surface of the housing 110.

The circular magnet 111 may be divided into four quadrants. In the following descriptions, that the circular magnet is divided into specific shapes means that the circular magnet is divided into pillars, each of which has a specific shape. The pillar having the specific shape means that a top surface of the pillar has the specific shape. That is, that the circular magnet 111 is divided into the four quadrants means that the circular magnet 111 is divided into four quadrant pillars. Each of the quadrants may be a first pole or a second pole. Two quadrants of the quadrants may be the first poles, and the other two quadrants may be the second poles. The quadrants adjacent to each other may have different polarities. In the drawings of this specification, portions filled with different patterns indicate different polarities. For example, in the circular magnet 111, a portion filled with a slash pattern may represent a first pole, and a portion filled with a dot pattern may represent a second pole. However, the present invention is not limited thereto, and the circular magnet 111 may be divided into 2n-divided circles or various shapes. Here, may be a positive number. Various embodiments of the circular magnet 111 will be described with reference to FIGS. 4A to 4C.

Boundary lines dividing the circular magnet 111 may not be parallel to a plane on which the connector structure 100 is placed (or a direction in which the connector 200 approaches the connector structure 100). Since the boundary lines are not disposed parallel to the plane on which the connector structure 100 is placed, greater magnetic force may be applied to the connector 200. However, the present invention is not limited thereto, and the boundary lines dividing the circular magnet 111 may be parallel to the plane on which the connector structure 100 is placed.

Since the removing tool 130 has substantially the same structure as the removing tool 120, the removing tool 120 will be mainly described in the following descriptions.

The removing tool 120 may include a circular magnet 121 and a bearing wheel 122. The circular magnet 121 may have substantially the same structure as the circular magnet 111. The circular magnet 121 may be disposed to face the circular magnet 111.

The removing tool 120 may rotate the circular magnet 121 using the bearing wheel 122. In the coupling mode, the removing tool 120 may rotate the circular magnet 121 so that any portion of the circular magnet 121 has the same polarity as a portion of the circular magnet 111 facing the any portion. In the separating mode, the removing tool 120 may rotate the circular magnet 121 so that any portion of the circular magnet 121 has a polarity different from that of a portion of the circular magnet 111 facing the any portion. In the following descriptions, that have polarities different from each other means that if one side is the first pole, the other side is the second pole. However, the present invention is not limited thereto, and a rectangular magnet having a rectangular parallelepiped shape may be used instead of the circular magnet 121 having the cylindrical shape. When the circular magnet 121 is replaced with the rectangular magnet, the remaining circular magnets 111, 112, and 131 may also be replaced with rectangular magnets. As an example, the rectangular magnet may be a magnet 311*b* or a magnet 311*c* of FIGS. 9A and 9B. A boundary line dividing the rectangular magnet into the first pole and the second pole may be perpendicular to the plane on which the connector structure 100 is placed. In addition, the rectangular magnet is fixed to the bearing wheel 122 and may be rotated as the bearing wheel 122 is rotated. This structure will be described with reference to FIG. 5.

The removing tool 130 may rotate the circular magnet 131 using the bearing wheel 132. In the coupling mode, the removing tool 130 may rotate the circular magnet 131 so that any portion of the circular magnet 131 has the same polarity as a portion of the circular magnet 112 facing the any portion. In the separating mode, the removing tool 130 may rotate the circular magnet 131 so that any portion of the circular magnet 131 has a polarity different from that of a portion of the circular magnet 112 facing the any portion.

In this case, in the coupling mode, magnetic force (specifically, attractive force) generated by the circular magnets 111, 112, 121, and 131 may act on the coupling part 220. The coupling part 220 may be a paramagnetic material or a ferromagnetic material. Thus, the magnetic force may attract the coupling part 220 to the connector structure 100, specifically, the circular magnets 111, 112, 121, and 131. Due to the magnetic force, the device or the user may couple the connector 200 to the connector structure 100 with only weaker force.

In the separating mode, the circular magnets 121 and 131 may weaken and/or offset the magnetic force generated by the circular magnets 111 and 112, respectively. In the separating mode, the magnetic force due to the circular magnets 111 and 112 may not act on the coupling part 220. Thus, the device or the user may separate the connector 200 from the connector structure 100 without applying force greater than that in a normal case. Thus, damage of the connector structure 100 and the connector 200 due to the coupling and separation operations may be minimized.

FIG. 1 illustrates an operation of the connector structure 100 in the coupling mode. Referring to FIG. 1, in the coupling mode, a polarity of a portion of the circular magnet 111 and a polarity of a portion facing the portion of the circular magnet 121 are the same. Although the polarity of the circular magnet 112 is not indicated in FIG. 1, the polarity of the portion of the circular magnet 112 and the polarity of the portion facing the portion of the circular magnet 131 are also the same. FIG. 2 illustrates an operation of the connector structure 100 in the separating mode. Referring to FIG. 2, in the separating mode, a polarity of a portion of the circular magnet 111 is different from that of a portion facing the portion of the circular magnet 121. Although the polarity of the circular magnet 112 is not indicated in FIG. 2, the polarity of the portion of the circular magnet 112 and the polarity of the portion facing the portion of the circular magnet 131 are also different from each other.

In the above, the connector structure 100 has been described as rotating the circular magnets 121 and 131 in the coupling mode and the separating mode, but the present invention is not limited thereto. The connector structure 100 may rotate the circular magnets 111 and 112 instead of the circular magnets 121 and 131 in the coupling mode and the separating mode to adjust the magnetic force acting on the connector 200 as described above. Here, both the circular magnets 121 and 131 and the circular magnets 111 and 112 may be rotated. In this case, for rotation of the circular magnets 111 and 112, the connector structure 100 may include a bearing wheel surrounding each of the circular magnets 111 and 112.

Figure 3:
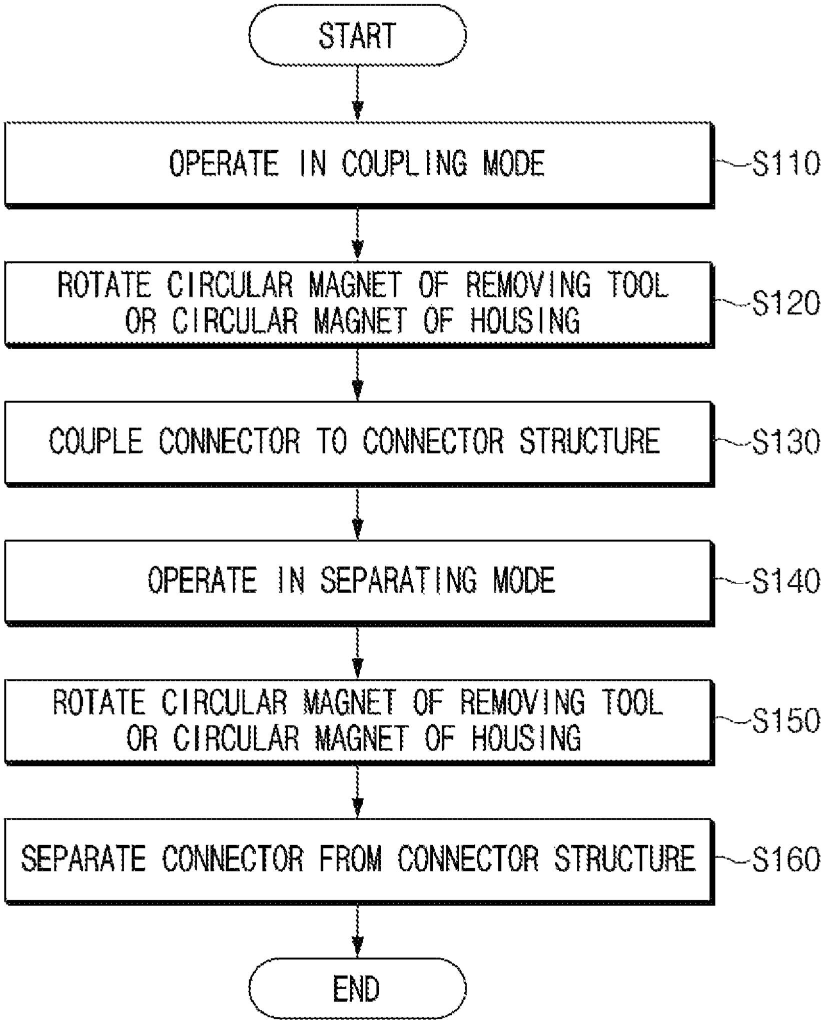
FIG. 3 is a flowchart for explaining an operation of the connector structure 100 of FIG. 1.

FIG. 3 is a flowchart for explaining an operation of the connector structure 100 of FIG. 1.

In operation S110, the connector structure 100 and the connector 200 of FIG. 1 may operate in a coupling mode.

In operation S120, the connector structure 100 may rotate the circular magnets 121, 131 of the removing tools 120, 130 and/or the circular magnets 111, 112 of the housing 110. As described with reference to FIG. 1, the connector structure 100 may rotate the circular magnet 121 and/or the circular magnet 111 so that any portion of the circular magnet 121 has the same polarity as a portion of the circular magnet 111 facing the any portion. The connector structure 100 may rotate the circular magnet 131 and/or the circular magnet 113 so that so that any portion of the circular magnet 131 has the same polarity as a portion of the circular magnet 112 facing the any portion. Thus, the connector 200 may receive attractive force to the connector structure 100 by the magnetic force generated by the circular magnets 111, 112, 121, and 131.

In operation S130, the connector 200 may be more easily coupled to the connector structure 100 by manpower.

In operation S140, the connector structure 100 and the connector 200 may operate in a separating mode.

In operation S150, the connector structure 100 may rotate the circular magnets 121, 131 of the removing tools 120, 130 and/or the circular magnets 111, 112 of the housing 110. As described with reference to FIG. 1, the connector structure 100 may rotate the circular magnet 121 and/or the circular magnet 111 so that a polarity of any portion of the circular magnet 121 and a polarity of a portion of the circular magnet 111 facing the any portion are different from each other. The connector structure 100 may rotate the circular magnet 131 and/or the circular magnet 113 so that so that a polarity of any portion of the circular magnet 131 and a polarity of a portion of the circular magnet 112 facing the any portion are different from each other. Thus, the magnetic force acting on the connector 200 in the coupling mode may be removed.

In operation S160, the connector 200 may be removed from the connector structure 100 without larger force.

Figure 4A:
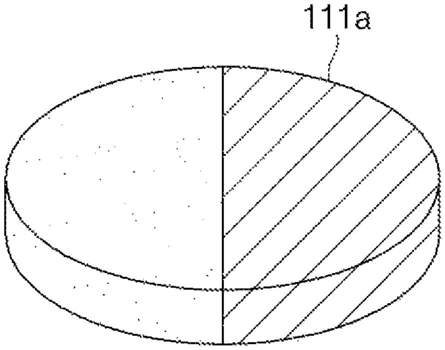
FIGS. 4A to 4C are conceptual views illustrating various embodiments of a circular magnet 111 of FIG. 1.
Figure 4B:
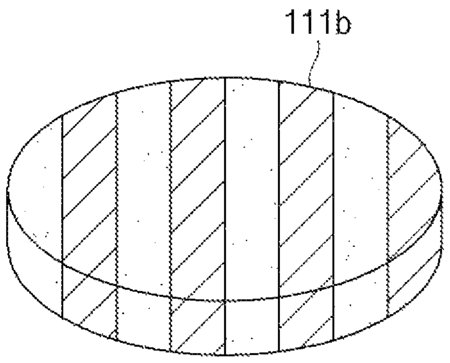
Figure 4C:
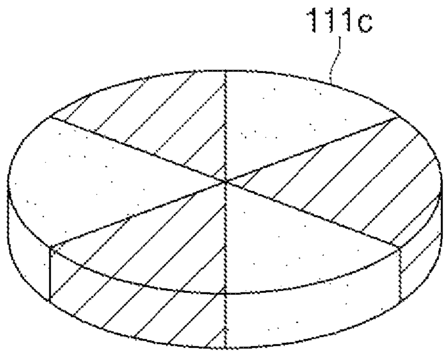

FIGS. 4A to 4C are conceptual views illustrating various embodiments of the circular magnet 111 of FIG. 1.

The circular magnet 111 of FIG. 1 may be replaced with one of the circular magnets 111*a*, 111*b*, 111*c* of FIGS. 4C to 4C and may also be replaced with a circular magnet having the features of the present invention, which are disclosed in this specification. Correspondingly, not only the circular magnet 111 but also the other circular magnets 112, 121, and 131 may be replaced.

The circular magnet 111*a* may be divided into two semicircles. A boundary line between the semicircles may be a line, which is perpendicular to a horizontal line, or an inclined line. In the following descriptions, the horizontal line means a line parallel to the plane on which the connector structure 100 of FIG. 1 is placed. One of the two semicircles may be a first pole, and the other may be a second pole.

The circular magnet 111*b* may be divided into 2m sections by 2m−1 lines. Here, 'm' is a positive number. Referring to FIG. 4B, 'm' may be 4. The 2m−1 lines may be lines inclined at the same angle with respect to the horizontal line. The 2m sections may be the first pole or the second pole. Specifically, the sections adjacent to each other among the 2m sections may have different polarities.

As described with reference to FIG. 1, the circular magnet 111*c* may be divided into 2n-divided circles by n lines. Here, 'n' is a positive number, and referring to FIG. 4C, 'n' may be 3. The n lines may be lines passing through an origin point. Each of the 2n-divided circles may be the first pole or the second pole. Specifically, 2n 2n-divided circles adjacent to each other among the 2n-divided circles may have different polarities.

Figure 5:
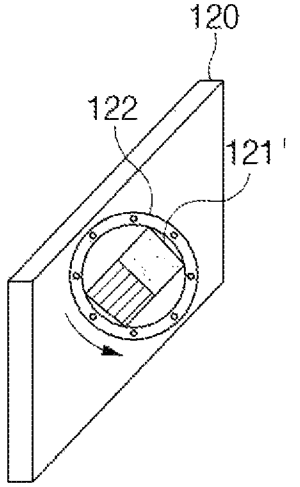
FIG. 5 is a conceptual view of a removing tool including a rectangular magnet according to an embodiment of the present invention.

FIG. 5 is a conceptual view of a removing tool including a rectangular magnet according to an embodiment of the present invention.

As described with reference to FIG. 1, the removing tool 120 of FIG. 1 may include a rectangular magnet 121' having a rectangular parallelepiped shape instead of the circular magnet 121 having the cylindrical shape. As illustrated in FIG. 1, the rectangular magnet 121' is fixed to the bearing wheel 122 and may be rotated as the bearing wheel 122 is rotated. That is, the present invention may adjust magnetic force acting on the connector 200 of FIG. 1 in the coupling mode and the separating mode by rotating the rectangular magnet 121'.

Figure 6:
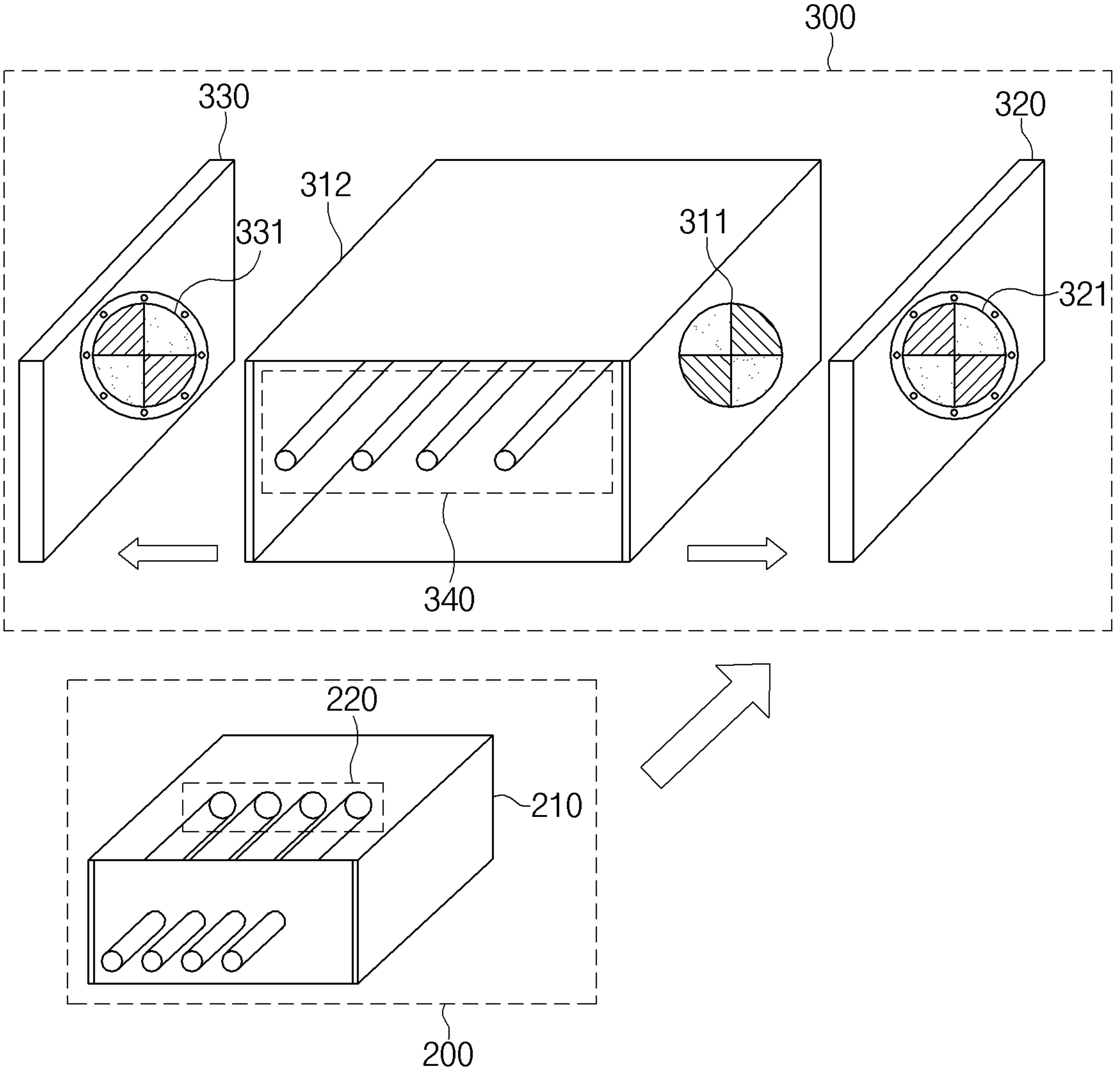
FIG. 6 is a conceptual view for explaining a method for coupling a connector to a connector structure according to another embodiment of the present invention.
Figure 7:
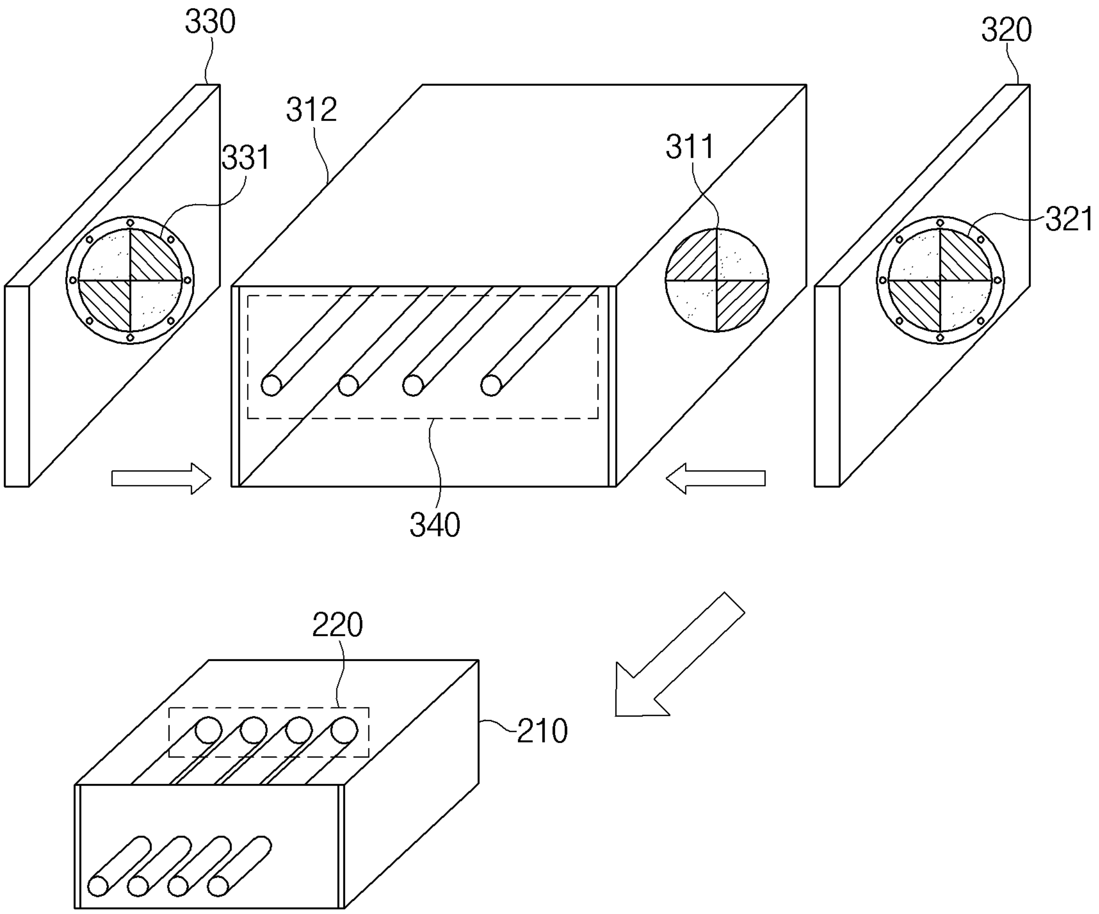
FIG. 7 is a conceptual view for explaining a method for separating the connector from the connector structure according to another embodiment of the present invention.

FIG. 6 is a conceptual view for explaining a method for coupling a connector to a connector structure according to another embodiment of the present invention. FIG. 7 is a conceptual view for explaining a method for separating the connector from the connector structure according to another embodiment of the present invention. In order to facilitate understanding of the present invention, FIGS. 6 and 7 will be described together.

Configurations 310, 320, 330, and 340 of the connector structure 300 illustrated in FIGS. 6 and 7 may provide operations similar to those of the configurations 110, 120, 130, and 140 of the connector structure 100 illustrated in FIGS. 1 and 2, respectively. Thus, with reference to FIGS.

6 and 7, the duplicated descriptions will be omitted, and the difference between the connector structure 300 and the connector structure 100 will be mainly described.

A connector structure 300 may include a housing 310, removing tools 320 and 330, and a coupling part 340. The connector structure 300 may be coupled to or separated from the connector 200 according to an operation mode. For example, the connector structure 300 may be a male connector, and the connector 200 may be a female connector.

The connector structure 300 may move the removing tools 320 and 330 without rotating the magnets 311, 312, 321, and 331 to adjust magnetic force acting on the connector 200. In this case, the magnets 321 and 331 may be disposed on the removing tools 320 and 330 so that any portions of the magnets 321 and 331 have the same polarity as portions of the magnets 311 and 312 facing the any portions, respectively. Also, in this case, the magnets 311, 312, 321, and 331 may be various types of magnets. Each of the magnets 311, 312, 321, and 331 may be a rectangular magnet having a rectangular parallelepiped shape, and various embodiments of the rectangular magnet will be described with reference to FIGS. 9B and 9C.

However, the present invention is not limited thereto, and the connector structure 300 may rotate the magnets 311, 312, 321, and 331 and move the removing tools 320 and 330 to adjust the magnetic force acting on the connector 200. In this case, it is unnecessary that the magnets 321 and 331 are disposed on the removing tools 320 and 330 so that any portions of the magnets 321 and 331 have the same polarity as portions of the magnets 311 and 312 facing the any portions, respectively.

In coupling mode, the connector structure 300 may move removing tools 320 and 330 in a direction that is away from housing 310. Thus, the magnetic force generated by the magnets 311 and 312 may be stronger than the magnetic force generated by the magnets 321 and 331 on the connector 200. The connector 200 may receive attractive force to the connector structure 300 by the magnetic force generated by the magnets 311 and 312. Due to the magnetic force, the device or the user may couple the connector 200 to the connector structure 300 with only weaker force.

In the disconnect mode, the connector structure 300 may move the removing tools 320 and 330 in a direction that is closer to the housing 310. The magnetic force of the magnets 321 and 331 acting on the connector 200 may be weakened and/or offset by the magnets 311 and 312. Thus, the device or the user may separate the connector 200 from the connector structure 300 without applying force greater than that in a normal case. Thus, damage of the connector structure 300 and the connector 200 due to the coupling and separation operations may be minimized.

FIG. 6 illustrates an operation of the connector structure 300 in the coupling mode. FIG. 7 illustrates an operation of the connector structure 300 in the separating mode. Comparing FIGS. 6 and 7, it is confirmed that the removing tools 320 and 330 are disposed closer to the housing 310 in the separating mode rather than in the coupling mode.

Figure 8:
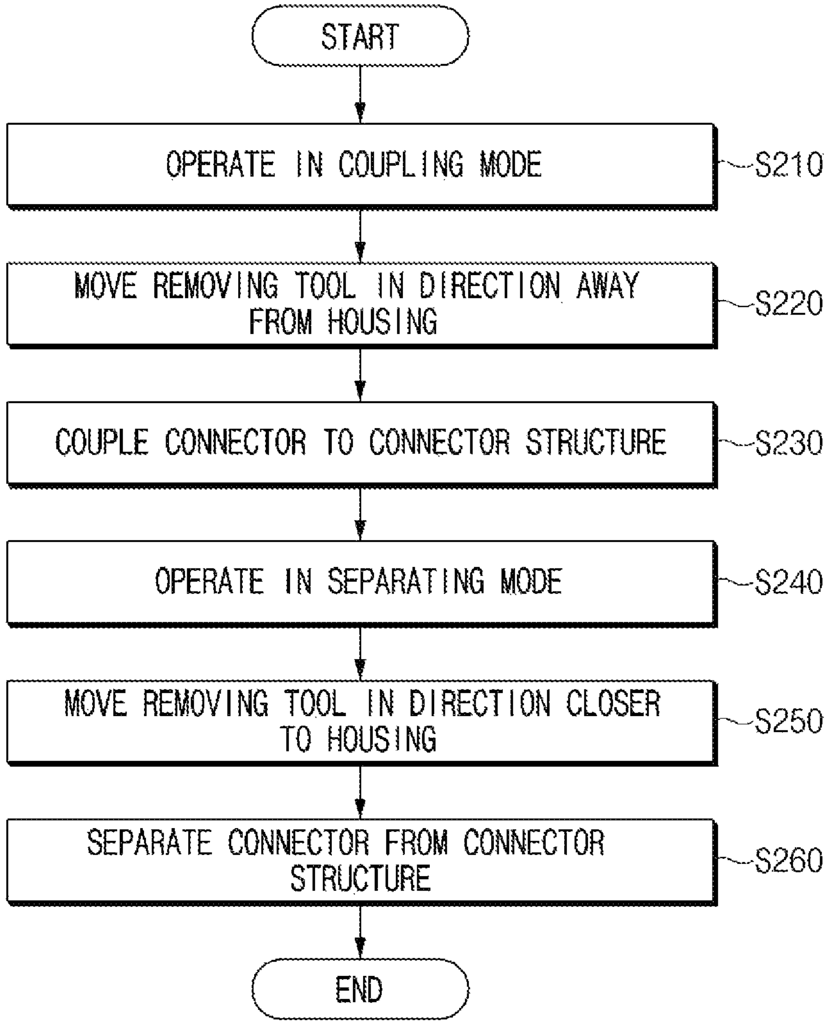
FIG. 8 is a flowchart for explaining an operation of the connector structure 300 of FIG. 6.

FIG. 8 is a flowchart for explaining an operation of the connector structure 300 of FIG. 6.

In operation S210, the connector structure 300 and the connector 200 of FIG. 6 may operate in a coupling mode.

In operation S220, the connector structure 300 may move removing tools 320 and 330 in a direction that is away from housing 310. The connector 200 may receive attractive force to the connector structure 300 by the magnetic force generated by the magnets 112 and 121.

In operation S230, the connector 200 may be more easily coupled to the connector structure 300 by manpower.

In operation S240, the connector structure 300 and the connector 200 may operate in a separating mode.

In operation S250, the connector structure 300 may move the removing tools 320 and 330 in a direction that is closer to the housing 310. The magnetic force of the magnets 112 and 121 may be offset by the magnets 321 and 331 to remove the attractive force acting on the connector 200.

In operation S260, the connector 200 may be removed from the connector structure 300 without larger force.

Figure 9A:
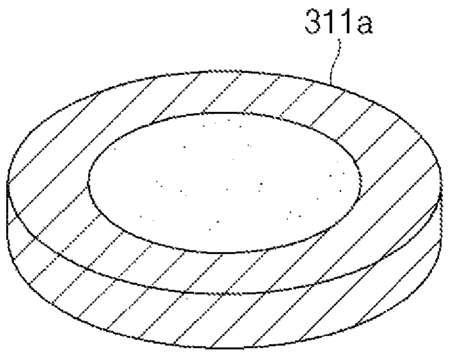
FIGS. 9A to 9C are conceptual views illustrating various embodiments of a magnet 311 of FIG. 6.
Figure 9B:
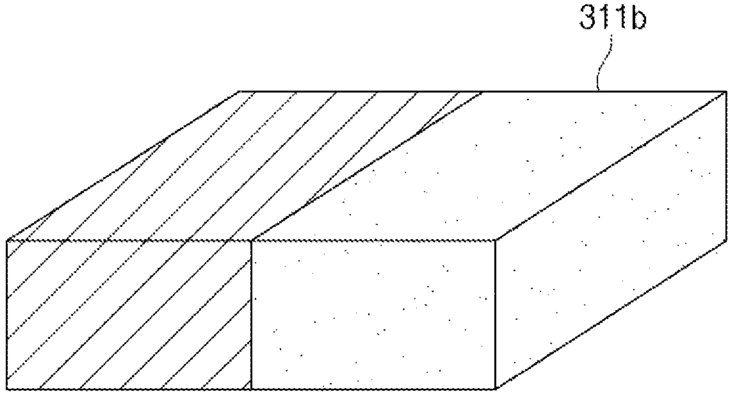
Figure 9C:
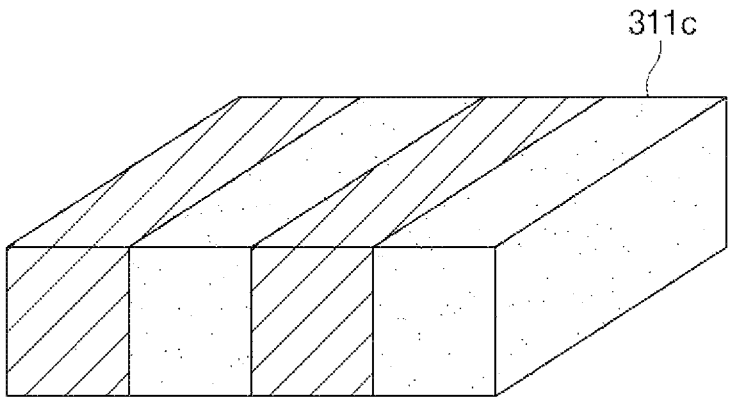

FIGS. 9A to 9C are conceptual views illustrating various embodiments of a magnet 311 of FIG. 6.

The magnet 311 of FIG. 6 may be replaced with one of magnets 311*a*, 311*b*, 311*c* of FIGS. 9A to 9C and may also be replaced with a magnet having the features of the present invention, which are disclosed in this specification. For example, the magnet 311 may be replaced with one of the magnet 111 of FIG. 1 and the magnets 111*a*, 111*b*, and 111*c* of FIGS. 4*a* to 4*c*. The magnet 311 as well as the other magnets 312, 321, and 331 may be replaced.

The magnet 311*a* may be a circular magnet. The magnet 311*a* may be divided into a single circle and a ring surrounding the circle. Correspondingly, the magnet 321 may also be divided into a single circle and a ring surrounding the circle. In this case, when the circle portion and the ring portion of the magnet 311*a* are the first pole and the second pole, respectively, the circle portion and the ring portion of the magnet 321 may be the second pole and the first pole, respectively. Also, when the circle portion and the ring portion of the magnet 311*a* are the second pole and the first pole, respectively, the circle portion and the ring portion of the magnet 321 may be the first pole and the second pole, respectively.

Each of the magnet 311*b* and the magnet 311*c* may be a rectangular magnet. The rectangular magnet may be divided into 2k rectangles by 2k−1 lines. Here, ‘k’ is a positive number. Referring to FIG. 9B, ‘k’ may be 1, and referring to FIG. 9C, ‘k’ may be 2. The 2k−1 lines may be lines perpendicular to a plane on which the connector structure 300 is placed. Each of the 2k rectangles may be the first pole or the second pole. Specifically, the rectangles among the 2k rectangles may have different polarities.

The above-described contents are specific embodiments for carrying out the present invention. The present invention will include not only the above-described embodiments, but also simple design changes or easily changeable embodiments. In addition, the present invention will include techniques that can be easily modified and implemented using the embodiments. Therefore, the scope of the present invention is defined not by the detailed description of the inventive concept but by the appended claims, and all differences within the scope will be construed as being included in the present invention.

The invention claimed is:

1. A connector structure comprising:

a connector insert removably connectable to a female connector; and a housing comprising a first magnet on a first surface of the connector insert, the housing being configured to attract the female connector by a magnetic force of the first magnet, wherein the first magnet is rotatable between a coupling mode and a separating mode, wherein the magnetic force between the first magnet and the female connector is stronger in the coupling mode than in the separating mode.

2. The connector structure of claim 1, wherein the first magnet is divided into sections by one or more boundary lines, adjacent sections of the first magnet have different polarities, and the one or more boundary lines are antiparallel to a plane on which the connector structure is configured to be mounted.

3. The connector structure of claim 1, further comprising a first tool comprising a second magnet configured to rotate to control a rotation of the first magnet of the housing between the coupling mode and the separating mode.

4. The connector structure of claim 3, wherein each of the first magnet and the second magnet is cylindrical.

5. The connector structure of claim 3, wherein the first surface faces the first tool, and wherein, in the coupling mode, first and second poles of the second magnet align with first and second poles of the first magnet, respectively, and, in the separating mode, the first and second poles of the second magnet align with the second and first poles of the first magnet, respectively.

6. The connector structure of claim 5, wherein each of the first magnet and the second magnet is circular, and wherein each of the first and second poles of the first and second magnets is semicircular.

7. The connector structure of claim 5, wherein each the first and second magnets are circular and divided into four quadrants that alternate between the first pole and the second pole.

8. The connector structure of claim 5, wherein the connector structure is configured to control a distance between the first tool and the housing, wherein the connector structure is configured to control the first tool to be closer to the housing in the separating mode and to be farther from the housing in the coupling mode.

9. The connector structure of claim 5, wherein the housing comprises a third magnet on a second surface opposite the first surface, wherein the housing is configured to attract the female connector by a magnetic force of the third magnet, wherein the third magnet is rotatable between the coupling mode and the separating mode, wherein the magnetic force between the third magnet and the female connector is stronger in the coupling mode than in the separating mode, and the connector structure further comprises a second tool comprising a fourth magnet configured to rotate to control a rotation of the third magnet of the housing between the coupling mode and the separating mode, and wherein the second surface faces the second tool.

10. The connector structure of claim 9, wherein the connector structure is configured to control a distance between the second tool and the housing, wherein the connector structure is configured to control the second tool to be closer to the housing in the separating mode and to be farther from the housing in the coupling mode.

11. A connector structure comprising:

a connector insert removably connectable to a female connector; and a housing comprising a first magnet on a first surface of the connector insert, the housing being configured to attract the female connector by a magnetic force of the first magnet; and a tool comprising a second magnet configured to move to control a strength of the magnetic force between the first magnet and the female connector between a coupling mode and a separating mode based on a distance of the second magnet from the housing, wherein the second magnet is farther from the housing and the magnetic force is stronger in the coupling mode, and wherein the second magnet is closer to the housing and the magnetic force is weaker in the separating mode.

12. The connector structure of claim 11, wherein the connector structure is configured to control a distance between the tool and the housing, wherein the connector structure is configured to control the tool to be closer to the housing in the separating mode and to be farther from the housing in the coupling mode.

13. The connector structure of claim 11, wherein at least one of the first magnet or the second magnet is configured to rotate between a first rotational position and a second rotational position, in the coupling mode, a portion of the first magnet having a first polarity is rotationally aligned with a portion of the second magnet have the first polarity, and in the separating mode, the portion of the first magnet is rotationally aligned with a portion of the second magnet having a second polarity different from the first polarity.

14. The connector structure of claim 11, wherein, in the separating mode, a portion of the second magnet having a first polarity is aligned with a corresponding portion of the first magnet having a second polarity different from the first polarity.

* * * * *